(12) United States Patent
Avinash et al.

(10) Patent No.: US 6,592,523 B2
(45) Date of Patent: Jul. 15, 2003

(54) COMPUTATIONALLY EFFICIENT NOISE REDUCTION FILTER FOR ENHANCEMENT OF ULTRASOUND IMAGES

(75) Inventors: Gopal B. Avinash, New Berlin, WI (US); Pinaki Ghosh, Bangalore (IN)

(73) Assignee: GE Medical Systems Global Technology Company, LLC, Waukesha, WI (US)

(*) Notice: Subject to any disclaimer, the term of this patent is extended or adjusted under 35 U.S.C. 154(b) by 0 days.

(21) Appl. No.: 10/064,469

(22) Filed: Jul. 17, 2002

(65) Prior Publication Data

US 2003/0097069 A1 May 22, 2003

Related U.S. Application Data

(63) Continuation-in-part of application No. 09/990,031, filed on Nov. 21, 2001.

(51) Int. Cl.$^7$ .................................................. A61B 8/00
(52) U.S. Cl. ............................. 600/443; 382/6; 382/56
(58) Field of Search ................................ 600/437–472; 358/426–467, 261.1–261.4; 382/56, 6

(56) References Cited

U.S. PATENT DOCUMENTS

| | | | | |
|---|---|---|---|---|
| 5,014,134 A | * | 5/1991 | Lawton et al. | 382/240 |
| 5,068,911 A | * | 11/1991 | Resnikoff et al. | 382/240 |
| 5,204,756 A | * | 4/1993 | Chevion et al. | 382/239 |
| 5,289,548 A | * | 2/1994 | Wilson et al. | 382/250 |
| 5,778,102 A | * | 7/1998 | Sandford et al. | 382/251 |
| 5,943,433 A | | 8/1999 | Avinash | |
| 6,173,083 B1 | | 1/2001 | Avinash | |
| 6,208,763 B1 | | 3/2001 | Avinash | |
| 6,315,722 B1 | * | 11/2001 | Yaegashi | 600/437 |
| 6,322,505 B1 | * | 11/2001 | Hossack et al. | 600/437 |

OTHER PUBLICATIONS

Li, Xiaojuan; Hu, Guangshu; and Gao, Shnagkai; Design and Implementation of a Novel Compression Method in a Tele–Ultrasound System, IEEE Transactions on Information Technology in Biomedicine, vol. 3, No. 3, Sep. 1999, p. 205–213.*

Chiu, Ed, Vaisey, Jacques; and Atkins, M. Stella; Wavelet–Based Space–Frequency Compression of Ultrasound Images, IEEE Transactions on Information Technology in Biomedicine, vol. 5, No. 4, Dec. 2001, p. 300–310.*

* cited by examiner

Primary Examiner—Marvin M. Lateef
Assistant Examiner—William C. Jung
(74) Attorney, Agent, or Firm—Ostrager Chong & Flaherty LLP

(57) ABSTRACT

In ultrasound imaging, acquired images are corrupted by slowly varying multiplicative non-uniformity. When the image is corrected for non-uniformity alone, noise in the dark regions of the original image becomes multiplicatively enhanced, thereby providing an unnatural look to the image. A pre-filtering technique is used to reduce noise in ultrasound pixel images by shrinking initial image data and processing the shrunken image with known segmentation-based filtering techniques that identify and differentially process structures within the image. The segmentation is based on both gradient threshold and the distance from the near field of the ultrasound image. This modification selectively suppresses near-field artifacts. After processing, the shrunken image is enlarged to the dimensions of the initial data and then blended with the initial image to form the final image. During blending, a small predetermined fraction of intensity-dependent, uniform random noise is added to the non-structure region pixels whose intensities are above a pre-specified intensity threshold, to mitigate ultrasound speckles while leaving non-echogenic regions undisturbed.

26 Claims, 5 Drawing Sheets

COMPUTATIONALLY EFFICIENT NOISE REDUCTION FILTER FOR ENHANCEMENT OF ULTRASOUND IMAGES

CROSS REFERENCE TO RELATED APPLICATIONS

This application is a continuation-in-part application claiming priority from U.S. patent application Ser. No. 09/990,031 filed on Nov. 21, 2001, the specification and drawings of which are incorporated herein by reference.

BACKGROUND OF INVENTION

This invention generally relates to imaging for the purpose of medical diagnosis. In particular, the invention relates to methods for imaging tissue and blood flow by detecting ultrasonic echoes reflected from a scanned region of interest in a human body.

Conventional ultrasound scanners are capable of operating in different imaging modes. In the B mode, for example, two-dimensional images can be generated in which the brightness of each display pixel is derived from the value or amplitude of a respective acoustic data sample representing the echo signal returned from a respective focal position within a scan region.

In B-mode imaging, an ultrasound transducer array is activated to transmit beams focused at respective focal positions in a scan plane. After each transmit firing, the echo signals detected by the transducer array elements are fed to respective receive channels of a receiver beam-former, which converts the analog signals to digital signals, imparts the proper receive focus time delays and sums the time-delayed digital signals. For each transmit firing, the resulting vector of raw acoustic data samples represents the total ultrasonic energy reflected from a succession of ranges along a receive beam direction. Alternatively, in multi-line acquisition two or more receive beams can be acquired following each transmit firing.

In conventional B-mode imaging, each vector of raw acoustic data samples is envelope detected and the resulting acoustic data is compressed (e.g., using a logarithmic compression curve). The compressed acoustic data is output to a scan converter, which transforms the acoustic data format into a video data format suitable for display on a monitor having a conventional array of rows and columns of pixels. This video data is typically referred to as "raw pixel intensity values". The frames of raw pixel intensity data are mapped to a gray scale for video display. Each gray-scale image frame, typically referred to as "gray-scale pixel intensity values", is then sent to the video monitor for display. In the case where a one-to-one gray-scale mapping is in effect, the raw and gray-scale pixel intensity values will be one and the same.

While a number of image processing parameters may control the final image presentation, it is often difficult to determine which of these parameters, or which combination of the parameters, may be adjusted to provide the optimal image presentation. Often, the image processing techniques must be adjusted in accordance with empirical feedback from an operator, such as a physician or technician.

The facility with which a reconstructed discrete pixel image may be interpreted by an observer may rely upon intuitive factors of which the observer may not be consciously aware. For example, in medical diagnostic ultrasound imaging, a physician or radiologist may seek specific structures or specific features in an image such as bone, soft tissue or fluids. Such structures may be physically defined in the image by contiguous edges, contrast, texture, and so forth.

The presentation of such features often depends heavily upon the particular image processing technique employed for converting the detected values representative of each pixel to modified values used in the final image. The image processing technique employed can therefore greatly affect the ability of an observer or an analytical device to recognize salient features of interest. The technique should carefully maintain recognizable structures of interest, as well as abnormal or unusual structures, while providing adequate textural and contrast information for interpretation of these structures and surrounding background. Ideally the technique will perform these functions in a computationally efficient manner so that processing times, as well as hardware requirements, can be minimized.

In ultrasound imaging, acquired images can be corrupted by slowly varying multiplicative inhomogeneities or non-uniformities in spatial intensity. Such non-uniformities can hinder visualization of the entire image at a given time, and can also hinder automated image analysis. When the image is corrected for non-uniformity alone, noise in the dark regions of the original image becomes multiplicatively enhanced thereby providing an unnatural look to the image. Such images are usually not preferred by radiologists.

There is a need for a computationally efficient method of pre-filtering ultrasound images in real time to reduce noise prior to the performance of additional image enhancement steps such as non-uniformity equalization and contrast enhancement.

SUMMARY OF INVENTION

The invention is directed to improving ultrasound images by means of image filtering. The image filtering is especially useful in combination with subsequent image enhancement steps, namely, non-uniformity equalization and contrast enhancement, but the image filtering process of the invention is independent of the subsequent image enhancement processes utilized.

The invention provides an improved technique for enhancing discrete pixel ultrasound images which is computationally efficient and which maintains image quality. The technique combines multi-resolution decomposition with a segmentation-based technique that identifies structures within an image and separately processes the pixels associated with those structures. This combination exploits the redundancies of an image while also allowing the separate processing of structures and non-structures.

Because of the efficiency of the disclosed technique, real-time or near real-time ultrasound imaging may be performed without utilizing hardware-based noise reduction techniques that can result in degraded, inferior images. In an exemplary embodiment, multi-resolution decomposition occurs when an input is shrunk by a given factor, allowing for the exploitation of redundancies in the image during subsequent processing. The shrunken image is then processed using a segmentation-based technique that begins by identifying the structural elements within a blurred or smoothed image. The segmentation is based on both gradient threshold and the distance from the near field. This segmentation processing renders the structural details more robust and less susceptible to noise and selectively suppresses near-field artifacts. While small, isolated regions may be filtered out of the image, certain of these may be recovered to maintain edge and feature continuity.

Following identification of the structures, portions of the image, including structural and non-structural regions, are smoothed. Structural regions are smoothed to enhance structural features in dominant orientations, thereby providing consistency both along and across structures. Non-structural regions may be homogenized to provide an understandable background for the salient structures.

Upon completion of the segmentation-based processing, the image is expanded by the same factor used during shrinking, thereby returning the image to its original size. Original texture is then added back to non-structural regions by blending to further facilitate interpretation of both the non-structural and structural features. In addition, a small predetermined fraction of intensity-dependent, uniform random noise is added to the non-structure region pixels whose intensities are above a predetermined intensity threshold, thereby mitigating ultrasound speckle in the expanded image while leaving non-echogenic subregions of the non-structure region undisturbed.

One aspect of the invention is an ultrasound imaging system comprising a data acquisition system for acquiring acoustic data, an image processor for converting acoustic data into a set of pixel intensity values for each image, a display monitor for displaying images, and a computer programmed to perform the following steps:(a) shrinking an initial image by a predetermined factor to produce a shrunken image;(b) creating a first binary mask as a function of whether pixels of the shrunken image have gradients greater than a gradient threshold and locations more than a predetermined distance from a near field in the shrunken image;(c) filtering pixels corresponding to structural components in the shrunken image in accordance with a first filtering algorithm, the structural components being identified by the first binary mask;(d) filtering pixels corresponding to non-structural components in the shrunken image in accordance with a second filtering algorithm different than the first filtering algorithm, the non-structural components being identified by the first binary mask(e) expanding the filtered image and the first binary mask by the predetermined factor to produce an expanded image and a first expanded binary mask;(f) blending one or more selected regions of the expanded image with a corresponding region or regions of the initial image, the blending being a function of the first binary mask;(g) adding uniform random noise to one or more selected echogenic non-structural regions of the expanded image; and(h) outputting a final image to the display monitor, the final image being derived by performing at least steps (a) through (h).

Another aspect of the invention is a method for filtering an ultrasound image, comprising the following steps:(a) shrinking an initial image by a predetermined factor to produce a shrunken image;(b) creating a first binary mask as a function of whether pixels of the shrunken image have gradients greater than a gradient threshold and locations more than a predetermined distance from a near field in the shrunken image;(c) filtering pixels corresponding to structural components in the shrunken image in accordance with a first filtering algorithm, the structural components being identified by the first binary mask;(d) filtering pixels corresponding to non-structural components in the shrunken image in accordance with a second filtering algorithm different than the first filtering algorithm, the non-structural components being identified by the first binary mask(e) expanding the filtered image and the first binary mask by the predetermined factor to produce an expanded image and a first expanded binary mask;(f) blending one or more selected regions of the expanded image with a corresponding region or regions of the initial image, the blending being a function of the first binary mask; and(g) adding uniform random noise to one or more selected echogenic non-structural regions of the expanded image to form a final image suitable for display or further image enhancement.

A further aspect of the invention is an ultrasound image filter comprising:means for shrinking an initial image by a predetermined factor to produce a shrunken image;means for orientation smoothing pixels corresponding to structural components in the shrunken image;means for iteratively low-pass filtering pixels corresponding to non-structural components in the shrunken image;means for expanding the filtered image by the predetermined factor to produce an expanded image;means for blending one or more selected regions of the expanded image with a corresponding region or regions of the initial image, the blending being a function of whether the corresponding pixel of the shrunken image has a gradient greater than a gradient threshold and a location more than a predetermined distance from a near field in the shrunken image; andmeans for adding uniform random noise to one or more selected echogenic non-structural regions of the expanded image to form a final image suitable for display or further image enhancement.

Yet another aspect of the invention is a method for filtering an ultrasound image, comprising the following steps: shrinking an initial image by a predetermined factor to produce a shrunken image; orientation smoothing pixels corresponding to structural components in the shrunken image; iteratively low-pass filtering pixels corresponding to non-structural components in the shrunken image; expanding the filtered image by the predetermined factor to produce an expanded image; blending one or more selected regions of the expanded image with a corresponding region or regions of the initial image, the blending being a function of whether the corresponding pixel of the shrunken image has a gradient greater than a gradient threshold and a location more than a predetermined distance from a near field in the shrunken image; and adding uniform random noise to one or more selected echogenic non-structural regions of the expanded image to form a final image suitable for display or further image enhancement.

A further aspect of the invention is a method for mitigating speckle in an ultrasound image, comprising the following steps: creating a binary mask having a first value binary value for each pixel of an image that satisfies a first condition of having a gradient greater than a gradient threshold and a second condition of having an intensity greater than a predetermined intensity level, and a second binary value for each pixel that does not meet both the first and second conditions; and adding uniform random noise to each pixel of the image that corresponds to a pixel in the binary mask having the first binary value and not adding noise to other pixels of the image.

Another aspect of the invention is an ultrasound imaging system comprising a data acquisition system for acquiring acoustic data, an image processor for converting acoustic data into a set of pixel intensity values for each image, a display monitor for displaying images, and a computer programmed to perform the following steps:(a) creating a binary mask having a first value binary value for each pixel of an image that satisfies a first condition of having a gradient greater than a gradient threshold and a second condition of having an intensity greater than a predetermined intensity level, and a second binary value for each pixel that does not meet both the first and second conditions; (b) adding uniform random noise to each pixel of the image that corresponds to a pixel in the binary mask having the first binary value and not adding noise to other pixels of the image; and(c) outputting a final image to the display monitor, the final image being derived by performing at least steps (a) and (b).

Other aspects of the invention are disclosed and claimed below.

DETAILED DESCRIPTION

Figure 1:
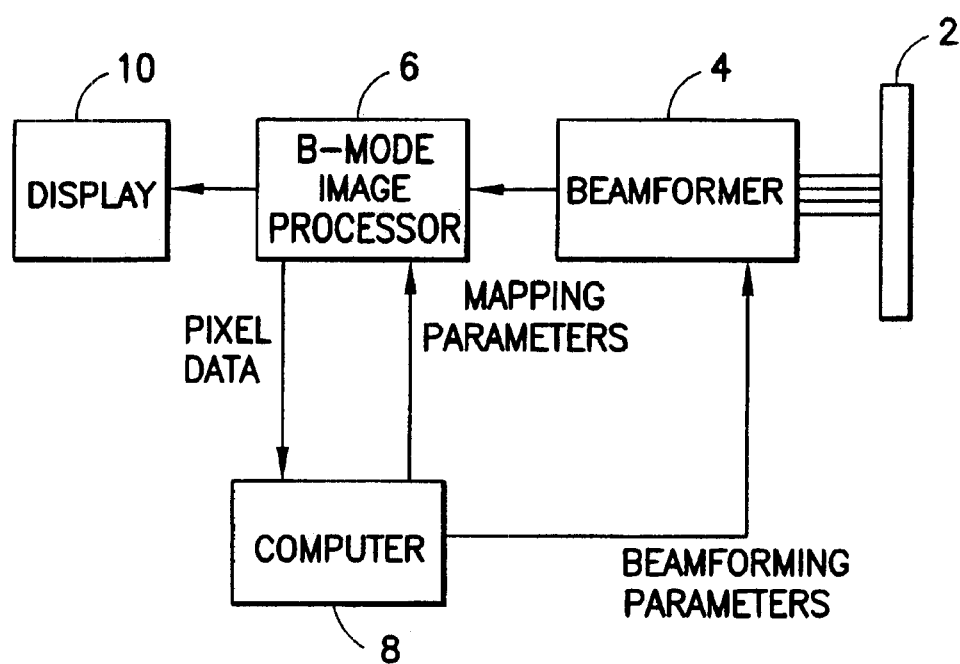
FIG. 1 is a block diagram generally showing a typical B-mode ultrasound imaging system.

Referring to FIG. 1, a B-mode ultrasound imaging system typically comprises a transducer array 2, a beamformer 4, a B-mode image processor 6, a host computer 8 and a display monitor 10. The transducer array 2 comprises a multiplicity of transducer elements which are activated by a transmitter in beamformer 4 to transmit an ultrasound beam focused at a transmit focal position. The return RF signals are detected by the transducer elements and then dynamically focused at successive ranges along a scan line by a receiver in beamformer 4 to form a receive vector of raw acoustic data samples. The beamformer output data (I/Q or RF) for each scan line is passed through a B-mode image processor 6, which processes the raw acoustic data into pixel image data in a format suitable for display by the display monitor 10.

System control is centered in a host computer 8, which accepts operator inputs through an operator interface (not shown), analyzes the acquired data and controls the various subsystems based on operator inputs and the results of data analysis. The host computer 8 may be programmed to perform the following functions: (1) providing transmit and beamforming parameters to the beamformer 4; (2) providing gray mappings to the B-mode image processor 6; (3) retrieving an image frame from memory, re-scaling that image frame and then sending the re-scaled image to the display monitor for display in a zoom mode; and (4) providing data compression curves to the B-mode image processor 6. Preferably, the gray map, beamforming parameters and compression curves are provided in the form of lookup tables stored in random access memory. Although FIG. 1 depicts separate paths for the communications to and from the host computer 8, it will be readily appreciated that these communications may take place over a common channel or system bus.

In an ultrasound image acquisition system, usually significant care is taken to sample the data at a frequency that is at least twice the highest spatial frequency of interest. In many cases, potential problems are avoided by oversampling. However, while visualizing an ultrasound image, variations from pixel to pixel due to acquisition noise, which is usually random, can be seen. In most image acquisition systems, additional structured noise (i.e., artifacts) will be present. In accordance with one embodiment of the present invention, the host computer 8 of the ultrasound imaging system depicted in FIG. 1 may be programmed to retrieve successive image frames of raw pixel intensity data from image processor 6 and then perform image filtering computations to reduce noise.

In order to mitigate random noise, many noise reduction filters have been proposed. Many of them use multi-resolution decomposition (e.g., wavelet-based techniques), which decomposes the image into various frequency bands, processes each band separately and then regroups all the frequency bands together to reconstitute the image. This class of techniques has the advantage of modifying a specific spatial frequency band of the image. A well-known corollary of these techniques in image compression is that substantially all the redundancies at a given scale are exploited to achieve high compression ratios without sacrificing the compression quality in these images. Another class of filters is segmentation-based. This class of techniques decomposes the image based on structures and non-structures, processes structures and non-structures separately and then recombines the processed structures and non-structures to form the final filtered image. Unlike in the previous case, this class of methods exploits the spatial connectedness of structures to substantially perform different operations on structures and non-structures.

Figure 2:
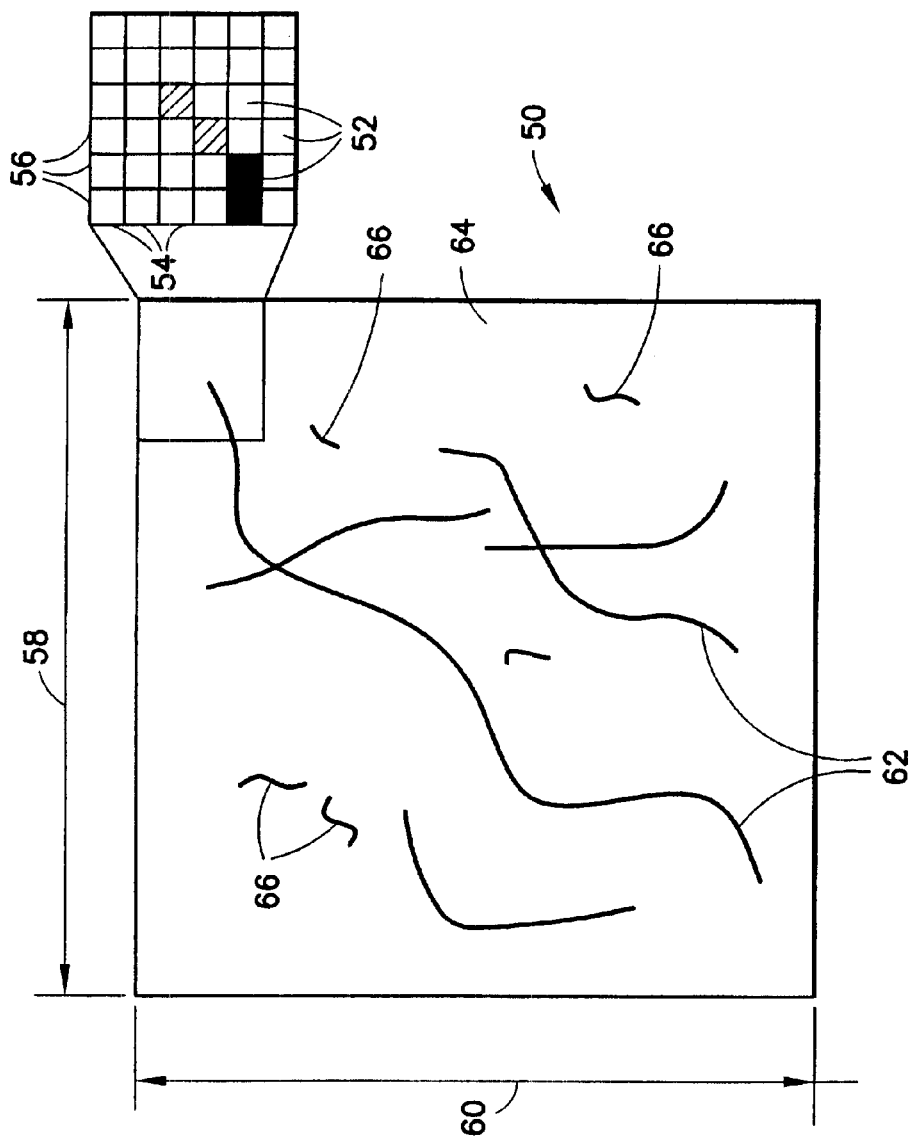
FIG. 2 is a diagram of an exemplary discrete pixel image made up of a matrix of pixels having varying intensities defining structures and non-structures.

FIG. 2 illustrates an exemplary image 50 composed of a matrix of discrete pixels 52 disposed adjacent to one another in a series of rows 54 and columns 56. These rows and columns of pixels provide a pre-established matrix width 58 and matrix height 60. Typical matrix dimensions may include 256×256 pixels; 512×512 pixels; 1,024×1,024 pixels, and so forth. The particular image matrix size may be selected via an operator interface (not shown in FIG. 1) and may vary depending upon such factors as the subject to be imaged and the resolution desired.

As seen in FIG. 2, exemplary image 50 includes structural regions 62, illustrated as consisting of long, contiguous lines defined by adjacent pixels. Image 50 also includes non-structural regions 64 lying outside of structural regions 62. Image 50 may also include isolated artifacts 66 of various sizes (i.e., varying number of adjacent pixels), which may be defined as structural regions, or which may be eliminated from the definition of structure in accordance with the techniques described below. It should be understood that the structures and features of exemplary image 50 are also features of the specific and modified images discussed below in relation to FIGS. 3 and 4.

Figure 3:
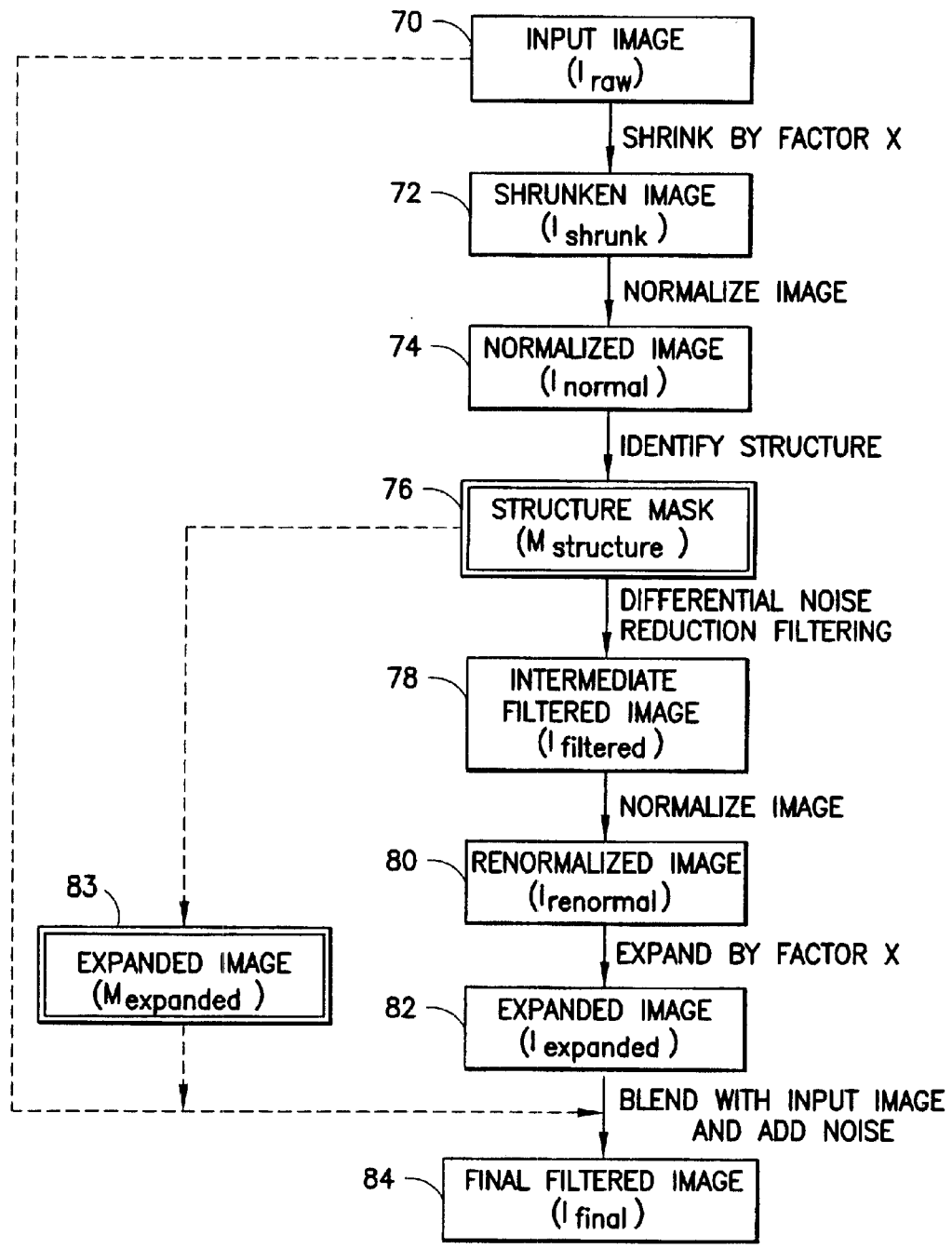
FIG. 3 is a flowchart illustrating the progression of an image through multi-resolution decomposition and segmentation-based processing.

A highly abstracted rendition of image filtering in accordance with one embodiment of the invention is illustrated in FIG. 3, beginning with the input of the raw signal data as input image 70 ($I_{raw}$). Input image 70 is shrunk by a user-configurable parameter (interp) to create a shrunken image 72 ($I_{shrunk}$). Shrunken image 72 undergoes normalization to create a normalized image 74 ($I_{normal}$). Threshold criteria are applied to identify structures within the normalized image 74. The structures identified are used to generate a structure mask 76 ($M_{structure}$) that is used in subsequent processing to distinguish both structure and non-structure regions, allowing differential processing of these regions. The mask is based on both gradient threshold and the distance of the pixel from the near field. This is to selectively suppress near-field artifacts. The normalized image 74 is filtered to reduce noise via structure mask 76, thereby creating an intermediate filtered image 78 ($I_{filtered}$) that is subsequently normalized by scaling to form renormalized image 80 ($I_{renormal}$). Renormalized image 80 and structure mask 76 are expanded to form an expanded image 82 ($I_{expanded}$) and an expanded structure mask 83 ($M_{expanded}$). Differential blending of the expanded image 82 and the input image 70 is accomplished via the application of the expanded structure mask 83. In addition, a small predetermined fraction of intensity-dependent, uniform random noise is added to pixels corresponding to the echogenic subregions of the nonstructure region. The purpose of noise addition is to mitigate ultrasound speckle. The product of the blending process is final filtered image 84 ($I_{final}$).

Figure 4:
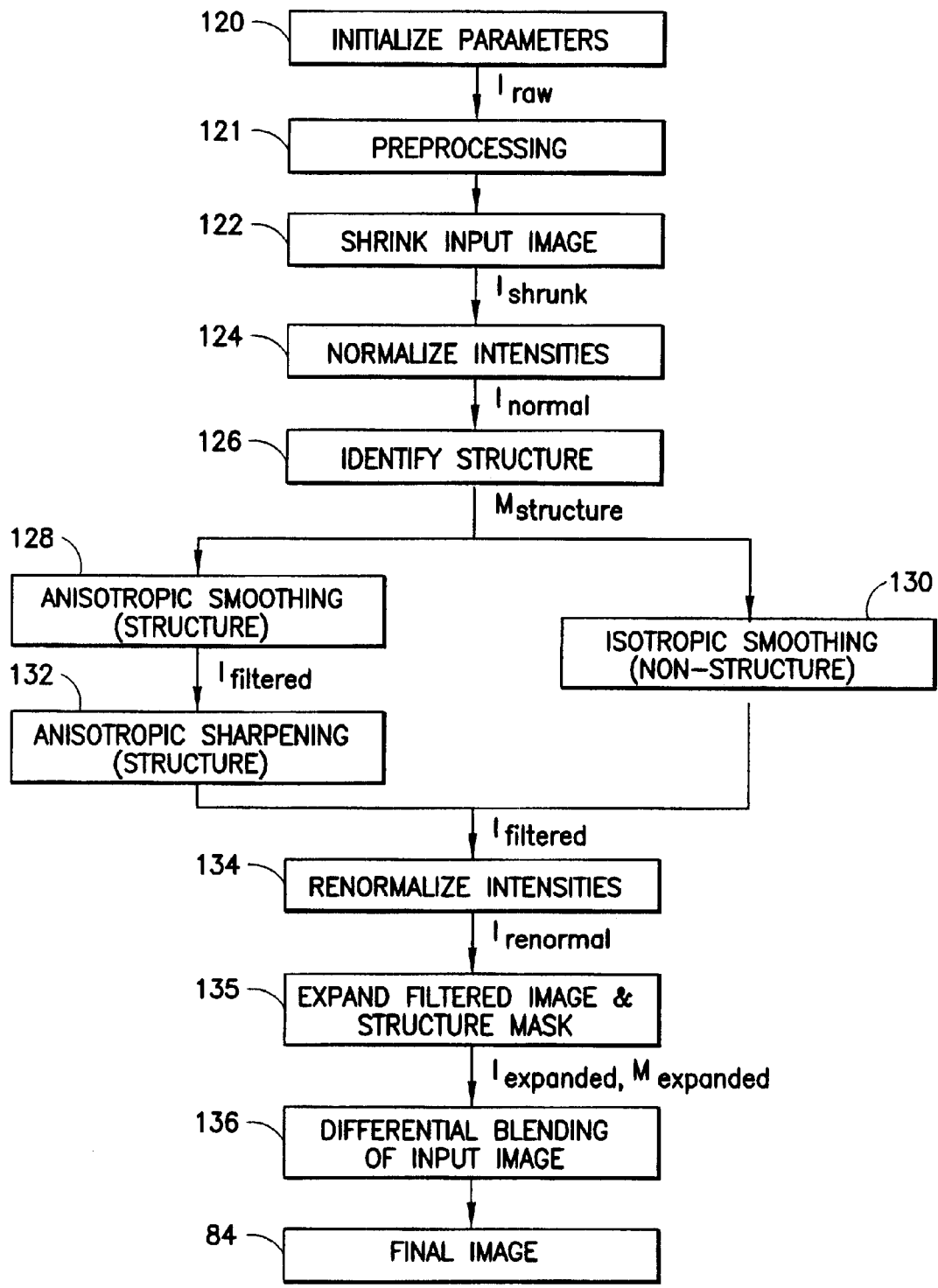
FIG. 4 is a flowchart illustrating steps in exemplary control logic for multi-resolution decomposition of a discrete pixel ultrasound image, identification of structures in that image and enhancement of both structural and non-structural regions in the image.

In accordance with method disclosed herein, the redundancy exploitation of multi-resolution-based techniques is combined with the spatial connectedness of the segmentation-based techniques to obtain a robust noise reduction with computationally efficient implementation. More specifically, in one embodiment of the invention, the host computer (or dedicated processor) of an ultrasound imaging system performs a noise-reduction filtering algorithm. One embodiment of this algorithm is generally depicted in FIG. 4. This algorithm comprises efficient real-time computations for mitigating noise based on structures, providing improved image quality at reduced cost, by replacing hardware-based noise reduction techniques that are being used to achieve real-time performance but at reduced image quality.

The first step 120 in the algorithm is to read the input data and the parameters that control the filtering. The parameters include the following: amount of shrinking (interp), interpolation type (interpMode), parameters specific to noise reduction (Focus, Edge, EdgeThreshold, Blend, edgeBlend). Parameter interp is usually set equal to 2, but higher values can be used to obtain faster implementations if moderate amounts of noise reduction would be sufficient for the given application. The other parameters can be tuned based on the domain knowledge of the radiologist/radiological technician. By means of this selection of shrinking parameter, specialized tuning for larger matrix images is not required and therefore, the otherwise laborious tuning process is simplified to a large extent.

In the preprocessing step 121, the size of the input raw image $I_{raw}$ is augmented to prevent loss of data when images are shrunk. Since the shrink (.) function requires integer values for performing data reduction, image boundaries are appropriately padded by mirroring the image data.

In step 122, the preprocessed input images are shrunk as determined by the parameter interp. The shrink (.) function uses average intensity values in non-overlapping integer neighborhoods of size interp X interp and creates a shrunken image $I_{shrunk}$. However, other sub-sampling techniques can be used.

Still referring to FIG. 4, the next step 126 is to normalize the pixel intensities of the shrunken image to form a normalized image $I_{normal}$. This step includes reading digital values representative of each pixel intensity and scaling those intensities over a desired dynamic range. First, internal parameters are initialized. These parameters include the following: iter_number2=10, length=3, areaPercent=0.95, follower_ratio=0.5, gradAngle=0.35, count_threshold1=2, count_threshold2=2. Second, the maximum (MAX_ORIGINAL) and minimum (MIN_ORIGINAL) intensity values are determined. Third, the scale is set equal to 4095.0/MAX_ORIGINAL. Fourth, the scaled image $I_{normal}$ is obtained using the relation: I=(I−MIN_ORIGINAL) * scale. Fifth, the pre-filtration image is saved as $I_1$=I. Sixth, compute the average intensity value (MEAN_BEFORE) of I. The main reason for scaling is to make the filtering effect independent of the dynamic range and the DC offset of the data.

The next step 126 in the algorithm is to extract structures and non-structures from a given normalized image, as defined by data representative of the individual pixels of the image. This is accomplished by determining structure and non-structure masks. The following steps are used for this purpose.

In the first step, a gradient image is computed from a blurred or smoothed version of the normalized original image. A boxcar smoothing is used in the preferred method. A boxcar filter smoothes an image by computing the average of a given neighborhood. The kernel is separable and efficient methods exist for its computation. The length of the separable kernel is variable (parameter length) but preferably set equal to 3 pixels. The kernel is moved horizontally and vertically along the image until each pixel has been processed.

In the second step, the edge strength threshold is computed automatically from the image by means of the following computations.

(1) At every pixel, compute the gradient component componentX, the Y gradient component componentY and the resultant gradient as the maximum of the two components. Compute the direction of the gradient using arctan (componentY/componentX).

More specifically, the X and Y gradient components for each pixel are computed based upon the smoothed version of the normalized image. While several techniques may be employed for this purpose, 3×3 Sobel modules or operators can be employed. As will be appreciated by those skilled in the art, one module is used for identifying the X gradient component, while another module is used for identifying the Y gradient component of each pixel. In this process, the modules are superimposed over the individual pixel of interest, with the pixel of interest situated at the central position of the 3×3 module. The intensity values located at the element locations within each module are multiplied by the scalar value contained in the corresponding element, and the resulting values are summed to arrive at the corresponding X and Y gradient components.

With these gradient components thus computed, the gradient magnitude $G_{mag}$ and gradient direction $G_{dir}$ are computed. The gradient magnitude for each pixel is equal to the higher of the absolute values of the X and Y gradient components for the respective pixel. The gradient direction is determined by finding the arctangent of the Y component divided by the X component. For pixels having an X component equal to zero, the gradient direction is assigned a value of $\pi/2$. The values of the gradient magnitudes and gradient directions for each pixel are saved in memory.

It should be noted that alternative techniques may be employed for identifying the X and Y gradient components and for computing the gradient magnitudes and directions. For example, those skilled in the art will recognize that in place of Sobel gradient modules, other modules such as the Roberts or Prewitt operators may be employed. Moreover, the gradient magnitude may be assigned in other manners, such as a value equal to the sum of the absolute values of the X and Y gradient components.

(2) Create the gradient histogram and use the 30 percentile value as an initial gradient threshold (IGT).

More specifically, based upon the gradient magnitude values, a gradient histogram is generated. The histogram is a bar plot of specific populations of pixels having specific gradient values. These gradient values are indicated by positions along a horizontal axis, while counts of the pixel populations for each value are indicated along a vertical axis, with each count falling at a discrete level. The resulting bar graph forms a step-wise gradient distribution curve. Those skilled in the art will appreciate that in the actual implementation, the histogram need not be represented graphically, but may be functionally determined by the image processing circuitry operating in cooperation with values stored in memory circuitry.

The histogram is used to identify a gradient threshold value for separating structural components of the image from non-structural components. The threshold value is set at a desired gradient magnitude level. Pixels having gradient magnitudes at or above the threshold value are considered to meet a first criterion for defining structure in the image, while pixels having gradient magnitudes lower than the threshold value are initially considered non-structure. The threshold value used to separate structure from non-structure is preferably set by an automatic processing or "autofocus" routine. However, it should be noted that the threshold value may also be set by operator intervention (e.g., via an operator interface) or the automatic value identified through the process described below may be overridden by the operator to provide specific information in the resulting image.

The process for identification of the threshold value begins by selecting an initial gradient threshold. This initial gradient threshold is conveniently set to a value corresponding to a percentile of the global pixel population, such as 30 percent. The location along the histogram horizontal axis of the IGT value is thus determined by adding pixel population counts from the left-hand edge of the histogram, adjacent to the vertical axis and moving toward the right (i.e., ascending in gradient values). Once the desired percentile value is reached, the corresponding gradient magnitude is the value assigned to the IGT.

(3) In the next step, a search is performed for edges of the desired structure. In a neighborhood of a pixel whose gradient is greater than the IGT, count the number of pixels which have gradient magnitudes above IGT and whose gradient directions do not differ from the center pixel more than a predetermined angle (parameter gradAngle). If the count is greater than a predetermined threshold, include the current pixel as a relevant edge.

(4) In the next step, small or noisy segments identified as potential candidates for structure are iteratively eliminated by isolating small segments less than a predetermined count using an eight-connected connectivity approach. Alternatively, a four-connected connectivity approach can be used.

(5) Count the number of edge pixels obtained as a result and add a fuzzy constant to their number to get a final number N.

(6) From the gradient histogram, compute the final gradient threshold (FGT), which corresponds to the gradient above which there are N gradient counts.

An algorithm to efficiently remove small islands of high-gradient segments is carried out using a connectivity approach as follows:(a) Obtain a binary image by thresholding the image based on a gradient value.

(b) Start a labeling process on a line-by-line basis while incrementing the label index.

(c) Merge the connected labels using the four-connected or eight-connected rule by replacing the current label with the lowest index in the neighborhood. This is done in an iterative fashion by scanning the binary image top to bottom and bottom to top until there are no more regions to be merged or a predetermined number of iterations are exceeded.

(d) Obtain the histogram of indices.

(e) Find those index bins that are lower than a predetermined number and set the corresponding pixel in the binary image equal to zero.

The resultant binary image would be the mask, which does not include small segments of high-gradient regions.

Figure 5:
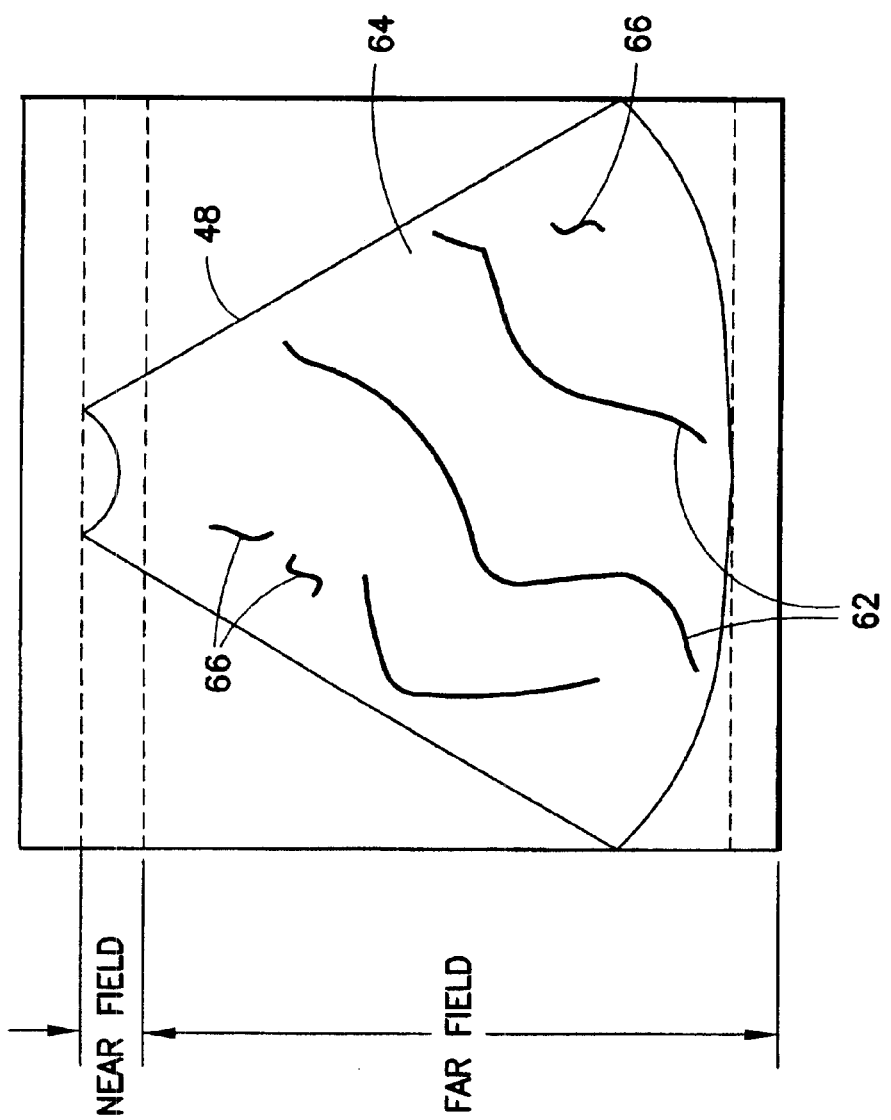
FIG. 5 is a schematic showing exemplary near and far fields in a sector-shaped ultrasound image.

In the third step, after the FGT has been obtained, it is scaled by multiplying with a user-selected parameter, Focus (e.g., 2.0). In the fourth step, a binary mask image $M_{structure1}$ is created such that the pixels are set to 1 if the corresponding pixels in the gradient image (a) have a gradient greater than FGT and (b) are located beyond a pre-specified distance from the near field An exemplary near field in a typical sector scan ultrasound image 48 is shown in FIG. 5. Otherwise the mask is set to 0.

In the fifth step, a second binary mask image $M_{structure2}$ is created such that the pixels are set to 1 if the corresponding pixels in the gradient image are higher than the pre-specified gradient threshold FGT and if the corresponding pixels in the initial intensity image are higher than a pre-specified intensity threshold. This is done only for pixels located beyond the pre-specified distance from the near field.

In the sixth step, isolated small segments in the binary image less than a predetermined count are eliminated using a four-connected connectivity approach. The resultant binary image is a mask that includes significant high-gradient regions but is devoid of small islands of high-gradient regions.

In the seventh step, certain of the isolated regions may be recuperated to provide continuity of edges and structures using a gradient following approach. If the pixel in the gradient image is above a threshold (GFT), which is a predetermined percentage (parameter follower_ratio) of FGT, and is connected to a pixel that is above FGT, then the corresponding pixel in the binary image from the previous step is changed from 0 to 1. This gradient following is usually carried out recursively and at the end an initial classification of pixels is obtained.

In the eighth step, the feature edges identified through previous steps, representative of candidate structures in the image, are binary rank order filtered to expand and define the appropriate width of contiguous features used to define structural elements. Simplistically, if the current mask pixel is 1, the neighborhood (e.g., 3×3) pixel count is computed. If the pixel count is below a countThreshold1 (e.g., 2), then the current mask pixel is set to 0. If the current mask pixel is 0, the neighborhood (e.g., 3×3) pixel count is computed. If the pixel count is above a countThreshold2 (e.g., 2), then the current mask pixel is set to 1. In each neighborhood count, pixels in the binary mask having values of 1 are counted within a 3×3 neighborhood surrounding the structural pixel of interest. This count includes the pixel of interest. The resulting structure mask $M_{structure1}$ contains information identifying structural features of interest and non-structural regions. Specifically, pixels in structure mask $M_{structure1}$ having a value of 1 are considered to identify structure, while pixels having a value of 0 are considered to indicate non-structure. This completes the structure identification step 126 seen in FIG. 4.

After structure in the image has been identified, the structure undergoes anisotropic smoothing (step 128) followed by anisotropic sharpening (step 132). In parallel with anisotropic smoothing of the structure identified within the image, isotropic smoothing of non-structure is performed (step 130). The details of these steps are as follows.

The anisotropic smoothing comprises conventional orientation smoothing. A region with structures is filtered to extract dominant orientation. The method involves iteratively filtering the structure by a 3×1 smoothing kernel along the dominant direction in a given neighborhood, which would be the direction of majority of the local minimum variances in that neighborhood. This process has the tendency to bridge gaps and the amount is controlled by a parameter. The iterations are performed a set number of times (e.g., 3).

Each iteration is accomplished using the following steps. The structure region is scanned and a local orientation map is obtained by assigning one of four orientation numbers, i.e., 1 for 45 degrees, 2 for 135 degrees, 3 for 90 degrees and 4 for 0 degree. The structure region is scanned again and the dominant orientation at any point is determined by counting the number of different orientations in a neighborhood. The orientation getting the maximum number of counts is the dominant orientation. As a further refinement, both the dominant direction and its orthogonal direction are used to make a consistency decision. This substantially improves the robustness of dominant orientation determination in the sense of being consistent with the human visual system.

The consistency decision is made if one of the following conditions is met: (1) The orientation getting maximum counts is greater than a pre-specified percentage (e.g., 0.67) of the total neighborhood counts, and the orthogonal orientation gets the minimum counts. (2) The orientation getting maximum counts is greater than a smaller percentage (e.g., 0.44) of the total neighborhood counts, and the orthogonal orientation gets the minimum count, and the ratio of the dominant count and its orthogonal count is greater than a pre-specified number (e.g., 5). (3) The ratio of dominant orientation count to its orthogonal orientation count is greater than 10.

Smoothing (3×1) is performed along the direction that gets the most number of counts in that neighborhood. Using a relaxation parameter provided in the algorithm, the dominant orientation smoothing can be minimized while preserving small high-frequency structures.

The orientation sharpening function (step 132 in FIG. 4) is performed only on orientation-filtered structure pixels that have gradients above a pre-specified limit, e.g., 2(FGT). The specific steps are the following:(1) First, the maximum directional edge strength image is obtained. The one-dimensional Laplacian of the image at every pixel in each of the four directions mentioned above is obtained using the equation: $E(k)=2.0 * I(k)-I(-1)-I(k+1)$, where the index ""k"" refers to the current location (i.e., the pixel of interest) along a given direction, E(k) is the edge strength, and I(k) is the intensity value at the pixel. After computing all four edge strengths at a given pixel, the maximum directional edge strength is determined and used in subsequent steps as the edge strength E(x,y) at that location. This process is continued for all pixels in the image. It should be noted that the border pixels in a given image have to be treated differently and are set equal to zero for the subsequent steps.

(2) The next function is to smooth along the edges of E(x,y). The steps needed for this are the same as before. Each pixel is compared to minimum and maximum threshold values Pixels that exceed the maximum threshold value are set equal to the maximum threshold value. Likewise, pixels which are less than the minimum threshold value are set equal to the minimum threshold value. More specifically, the smoothed edge strength image is referred herein as ES(x,y). If ES(x,y) * Edge>EdgeThreshold, then we set ES(x,y)=EdgeThreshold. Alternatively, if ES(x,y) * Edge<−EdgeThreshold, then we set ES(x,y)=−EdgeThreshold (e.g., Edge=0.3; EdgeThreshold=50).

(3) The resulting weighted values are added to the initial filtered values for the corresponding structural pixel to form a new filtered image: $I(x,y)=I(x,y)+ES(x,y)$.

(4) Each pixel is compared to both minimum and maximum threshold values. For example, I(x,y) is set to 0.0 if it is negative and to 4095.0 if it is greater than 4095.0. This upper limit is configurable to any number greater than zero. The effect of these operations is to more strongly enhance weaker edges while providing a more limited enhancement to edges that are already strong.

In parallel with orientation smoothing of the structure identified within the image, homogenization smoothing of non-structure is performed (step 130 in FIG. 4). The homogenizing smoothing step consists of iteratively low-pass filtering the nonstructure region with a 3×3 kernel. The iterations are done for a set number of times (e.g., iter_number2=10) so that there is no structural information and only the gradual intensity variations remain.

More specifically, the normalized intensity values for non-structural pixels are considered in this process. The mean neighborhood intensity value for each non-structural pixel is computed (taking into account the normalized values of structural pixels where these are included in the neighborhood considered). This computation is performed based on a 3×3 neighborhood surrounding each non-structural pixel. This mean value is assigned to the pixel of interest. A determination is then made whether a desired number of iterations has been completed. If not, further homogenization of the non-structural pixel intensity values is carried out. Once the desired number of iterations has been completed, the homogenization smoothing routine is exited. In one embodiment, the operator may set the number of homogenization smoothing iterations from a range of 1 to 10.

Following orientation sharpening of the structural features of the image and homogenization smoothing of non-structure regions, the entire image is again renormalized (step 134 in FIG. 4). While various methods may be used for this renormalization, in the disclosed embodiment the global average pixel intensity in the filtered image is computed, and a normalization factor is determined based upon the difference between this average value and the average value prior to the filtration steps described above. The new normalized intensity value for each pixel is then determined by multiplying this normalization factor by the filtered pixel intensity, and adding the global minimum intensity value from the original data to the product.

More specifically, the following operations are performed: (1) compute average pixel intensity (MEAN_AFTER) in the filtered image $I_{filtered}(x,y)$; (2) compute the normalization factor NORM_FACTOR=MEAN_BEFORE/MEAN_AFTER; and (3) compute the normalized image using: $I_{filtered}(x,y)=(I_{filtered}(x,y) * NORM\_FACTOR)+MIN\_ORIGINAL$, where MIN_ORIGINAL is the minimum intensity of the original image.

The resulting renormalized image $I_{renormal}$ is then expanded (step 135) by the same factor, interp, by which the input image $I_{raw}$ was shrunk. The structure masks $M_{structure1}$ and $M_{structure2}$ are also expanded by the same factor. Various suitable interpolation techniques may be used to accomplish this expansion. The products of the expansion step are expanded structure mask $M_{expanded1}$ and $M_{expanded2}$ and an expanded image $I_{expanded}$, each with the same dimensions as the original input image $I_{raw}$. The interpolation method is preferably bicubic for the renormalized image to provide a good compromise between computational efficiency and interpolated image quality and bilinear for the binary masks.

In step 136, the interpolated, filtered image $I_{expanded}(x,y)$ and the pre-filtration image $I_{raw}(x,y)$ are blended using the equation: $I_{final}(x,y)=\alpha * (I_{expanded}(x,y) I_{raw}(x,y))+I_{raw}(x,y)$ if $M_{structure1}(x,y)=0$, where $\alpha$ is a user-selected parameter Blend such that $0<\alpha<1$; else $I_{final}(x,y)=\beta * (I_{expanded}(x,y) I_{raw}(x,y))+I_{raw}(x,y)$ if $M_{structure1}(x,y)=1$, where $\beta$ is a user-selected parameter edgeBlend such that $0<\beta<1$.

In addition, noise blending is performed. In step 136 of the algorithm, high frequencies are introduced by adding very small amount of intensity-dependent, uniform random noise to the interpolated image to produce a visually pleasing effect. The amount of noise addition is dependent on whether $M_{structure2}(x,y)$ is 1 or 0. The preferred amount of added noise is usually less than 5% of the intensity of the filtered pixel.

The final result $I_{final}$ in then saved for display or any other intended use. The host computer may either output the final image to the display monitor or may enhance the final image before outputting to the display monitor. Such additional enhancement may take the form of non-uniformity equalization followed by contrast enhancement.Although the embodiments have been described with reference to image filtering by a host computer, it will be appreciated by persons skilled in the art that, in the alternative, the enhanced image frame could be generated by dedicated hardware.

While the invention has been described with reference to preferred embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

As used in the claims, the term "computer" means any programmable data processing device or system of intercommunicating programmable data processing devices capable of performing computations in accordance with a program. In particular, the term "computer"includes, but is not limited to, dedicated processors and general-purpose computers.

What is claimed is:

1. An ultrasound imaging system comprising a data acquisition system for acquiring acoustic data, an image processor for converting acoustic data into a set of pixel intensity values for each image, a display monitor for displaying images, and a computer programmed to perform the following steps:
    (a) shrinking an initial image by a predetermined factor to produce a shrunken image;
    (b) creating a first binary mask as a function of whether pixels of said shrunken image have gradients greater than a gradient threshold and locations more than a predetermined distance from a near field in said shrunken image;
    (c) filtering pixels corresponding to structural components in said shrunken image in accordance with a first filtering algorithm, said structural components being identified by said first binary mask;
    (d) filtering pixels corresponding to non-structural components in said shrunken image in accordance with a second filtering algorithm different than said first filtering algorithm, said non-structural components being identified by said first binary mask
    (e) expanding said filtered image and said first binary mask by said predetermined factor to produce an expanded image and a first expanded binary mask;
    (f) blending one or more selected regions of the expanded image with a corresponding region or regions of the initial image, said blending being a function of said first binary mask;
    (g) adding uniform random noise to one or more selected echogenic non-structural regions of the expanded image; and
    (h) outputting a final image to said display monitor, said final image being derived by performing at least steps (a) through (h).

2. The system as recited in claim 1, wherein said blending step comprises blending one or more selected structural regions of the expanded image with a corresponding region or regions of the initial image.

3. The system as recited in claim 2, wherein said blending step further comprises blending one or more selected non-structural regions of the expanded image with a corresponding region or regions of the initial image.

4. The system as recited in claim 1, wherein said blending step comprises blending one or more selected non-structural regions of the expanded image with a corresponding region or regions of the initial image.

5. The system as recited in claim 1, further comprising the following steps:
    creating a second binary mask as a function of whether pixels of said shrunken image have gradients greater than said gradient threshold and intensities greater than a predetermined intensity level; and
    expanding said second binary mask by said predetermined factor to produce a second expanded binary mask,
    wherein uniform random noise is added as a function of said second binary mask.

6. The system as recited in claim 5, wherein the amount of noise added is less than 5% of the intensity of a filtered pixel.

7. The system as recited in claim 1, wherein said step of shrinking is accomplished using a sub-sampling technique.

8. The system as recited in claim 7, wherein said sub-sampling technique comprises the step of pixel averaging in a kernel.

9. The system as recited in claim 1, wherein said first filtering algorithm comprises an orientation smoothing function that is performed only on structure pixels.

10. The system as recited in claim 9, wherein said first filtering algorithm further comprises an orientation sharpening function that is performed only on orientation-filtered structure pixels that have gradients above a pre-specified limit.

11. The system as recited in claim 1, wherein said second filtering algorithm comprises iteratively low-pass filtering the non-structure regions with a kernel.

12. The system as recited in claim 1, wherein said step of expanding is accomplished using interpolation.

13. The system as recited in claim 12, wherein said filtered image is expanded using bicubic interpolation and said first binary mask is expanded using bilinear interpolation.

14. The system as recited in claim 1, wherein said blending step is performed with different proportions for different selected regions.

15. A method for filtering an ultrasound image, comprising the following steps:
(a) shrinking an initial image by a predetermined factor to produce a shrunken image;
(b) creating a first binary mask as a function of whether pixels of said shrunken image have gradients greater than a gradient threshold and locations more than a predetermined distance from a near field in said shrunken image;
(c) filtering pixels corresponding to structural components in said shrunken image in accordance with a first filtering algorithm, said structural components being identified by said first binary mask;
(d) filtering pixels corresponding to non-structural components in said shrunken image in accordance with a second filtering algorithm different than said first filtering algorithm, said non-structural components being identified by said first binary mask
(e) expanding said filtered image and said first binary mask by said predetermined factor to produce an expanded image and a first expanded binary mask;
(f) blending one or more selected regions of the expanded image with a corresponding region or regions of the initial image, said blending being a function of said first binary mask; and
(g) adding uniform random noise to one or more selected echogenic non-structural regions of the expanded image to form a final image suitable for display or further image enhancement.

16. The method as recited in claim 15, further comprising the following steps:
creating a second binary mask as a function of whether pixels of said shrunken image have gradients greater than said gradient threshold and intensities greater than a predetermined intensity level; and
expanding said second binary mask by said predetermined factor to produce a second expanded binary mask,
wherein uniform random noise is added as a function of said second binary mask.

17. The method as recited in claim 16, wherein the amount of noise added is less than 5% of the intensity of a filtered pixel.

18. The method as recited in claim 15, wherein said first filtering algorithm comprises an orientation smoothing function that is performed only on structure pixels.

19. The method as recited in claim 18, wherein said first filtering algorithm further comprises an orientation sharpening function that is performed only on orientation-filtered structure pixels that have gradients above a pre-specified limit.

20. The method as recited in claim 15, wherein said second filtering algorithm comprises iteratively low-pass filtering the non-structure regions with a kernel.

21. The method as recited in claim 15, wherein said step of expanding is accomplished using interpolation said filtered image being expanded using bicubic interpolation and said first binary mask being expanded using bilinear interpolation.

22. The method as recited in claim 15, wherein said blending step is performed with different proportions for different selected regions.

23. An ultrasound image filter comprising:
means for shrinking an initial image by a predetermined factor to produce a shrunken image;
means for orientation smoothing pixels corresponding to structural components in said shrunken image;
means for iteratively low-pass filtering pixels corresponding to non-structural components in said shrunken image;
means for expanding said filtered image by said predetermined factor to produce an expanded image;
means for blending one or more selected regions of the expanded image with a corresponding region or regions of the initial image, said blending being a function of whether the corresponding pixel of said shrunken image has a gradient greater than a gradient threshold and a location more than a predetermined distance from a near field in said shrunken image; and
means for adding uniform random noise to one or more selected echogenic non-structural regions of the expanded image to form a final image suitable for display or further image enhancement.

24. The filter as recited in claim 23, further comprising:
means for creating a binary mask as a function of whether pixels of said shrunken image have gradients greater than said gradient threshold and intensities greater than a predetermined intensity level; and
means for expanding said binary mask by said predetermined factor to produce an expanded binary mask,
wherein said means for adding uniform random noise adds noise as a function of said binary mask.

25. The filter as recited in claim 24, wherein the amount of noise added is less than 5% of the intensity of a filtered pixel.

26. A method for filtering an ultrasound image, comprising the following steps:
shrinking an initial image by a predetermined factor to produce a shrunken image;
orientation smoothing pixels corresponding to structural components in said shrunken image;
iteratively low-pass filtering pixels corresponding to non-structural components in said shrunken image;
expanding said filtered image by said predetermined factor to produce an expanded image;
blending one or more selected regions of the expanded image with a corresponding region or regions of the initial image, said blending being a function of whether the corresponding pixel of said shrunken image has a gradient greater than a gradient threshold and a location more than a predetermined distance from a near field in said shrunken image; and
adding uniform random noise to one or more selected echogenic non-structural regions of the expanded image to form a final image suitable for display or further image enhancement.

* * * * *